United States Patent [19]

Cascino

[11] Patent Number: 4,981,755
[45] Date of Patent: Jan. 1, 1991

[54] PLASTIC-COMPATIBLE VINYL FOAM
[75] Inventor: Lawrence A. Cascino, South Bend, Ind.
[73] Assignee: Gaska Tape, Inc., Elkhart, Ind.
[21] Appl. No.: 375,481
[22] Filed: Jul. 5, 1989
[51] Int. Cl.$^5$ ................................................ B32B 3/26
[52] U.S. Cl. .............................. 428/317.3; 427/208.8; 427/373; 428/343
[58] Field of Search .......................... 427/208.8, 373; 428/317.1, 317.3, 343; 521/73

[56]  References Cited
U.S. PATENT DOCUMENTS
4,423,110 12/1983 Sato ........................................ 521/73

FOREIGN PATENT DOCUMENTS
1032868 6/1966 United Kingdom ............. 428/317.3

Primary Examiner—William J. Van Balen
Attorney, Agent, or Firm—Thomas J. Dodd

[57] ABSTRACT

Expandable foam which includes a foamable polyvinylchloride (PVC) base resin combined with a glutarate ester plasticizer and stabilizing agents. The compound is cast on a release liner and heated to expand the compound into a foamed state. The resulting foam when coated with adhesive is particularly useful in adhering to plastic materials.

17 Claims, No Drawings

PLASTIC-COMPATIBLE VINYL FOAM

BACKGROUND OF THE INVENTION

This invention relates to expanded foam and will have application to a vinyl foam tape which is particularly useful in securing plastics to a substrate.

Expanded foam spacers and tapes are particularly useful in many widely diverse applications involving glass windows, mirrors, skylights and other products. Spacers also have application in bulk shipping of glass products particularly windshields as described in my U.S. Pat. No. 4,806,404, issued Feb. 21, 1989. Tapes are particularly useful in securing windows and skylights to a support frame.

With the advent of polycarbonate and acrylic substitutes for glass products, particularly skylights, a new expanded vinyl foam had to be developed. The vinyl foams currently on the market are unsuitable for use with plastics, such as acrylic and polycarbonate, due to the foam's tendency to crack or craze the plastic surface as the foam plasticizers migrate to the surface. Further, a common problem with current foams is the marring (or shadowing) of the plastic surface when the foam is removed. These problems are inherent to plastics primarily due to their tendency to absorb and retain (moisture) plasticizers from the vinyl foam at a much higher rate than glass.

SUMMARY OF THE INVENTION

The expanded vinyl foam of this invention is formulated to alleviate and in many cases eliminate the above problems of marring and cracking. The foam consists of a PVC base resin combined with a glutarate ester plasticizer and stabilizing agents. A small amount of a trimelliate ester plasticizer may also be added to the mixture prior to casting and expansion on a conventional release liner. The expanded vinyl foam may have an adhesive added to one or both outer surfaces if the foam is to be used as a tape. The resulting product may be produced in varying thicknesses and densities to accommodate a wide range of applications and does not promote cracking of the plastic as well as not marring the plastic surface when the foam is removed.

Accordingly, it is an object of this invention to provide for an expanded vinyl foam product which is particularly useful as a spacer or tape for plastic based products.

Another object is to provide for an expanded foam tape which does not cause cracking of the plastic surface.

Another object is to provide for an expanded foam tape which does not mar the surface of translucent plastics when separated.

Other objects will become apparent upon a reading of the following description.

DESCRIPTION OF THE PREFERRED EMBODIMENT

The preferred embodiment and method herein described are not intended to be exhaustive or to limit the invention to the precise form or steps disclosed. They are chosen and described to explain the principles of the invention and the application and practical use so that others skilled in the art might utilize the teachings thereof.

The expanded vinyl foam product of this invention can be more easily understood by following the method used to produce the foam which is outlined below. The foam will be particularly useful as a tape or a spacer for plastic-based materials, but is not limited to such uses.

The base component of the foam is a foamable PVC resin to which is added a quantity of a gluturate ester plasticizer and various stabilizing agents. A quantity of a trimelliate ester plasticizer may be added to the base mixture as well as a blowing agent and a viscosity depressant.

The above components are mixed together to form a homogenous mixture in the following proportions with the understanding that the foamable PVC component is used as a base figure only (all components are listed as by weight in the total mixture):

100 parts foamable PVC resin
70-140 parts glutarate ester plasticizer
0-10 parts trimelliate ester plasticizer
1-2 parts cell stabilizer
1.5-2 parts activator stabilizer
1.5-2 parts color stabilizer approx. 3.5 parts blowing agent
5-15 parts viscosity depressant It should be noted that all of the above compounds are well-known to a person skilled in the art of producing vinyl foams and vinyl foam tapes and are readily available from a number of suppliers under various trade names. The amount of blowing agent added to the mixture will depend upon the desired density and thickness of the end product, with the proper amount also well-known to one having knowledge in this field. The stated amount is required to produce a vinyl foam having a density of about fifteen pounds per cubic foot, with more or less blowing agent (usually an azodicarbonamide) added to vary the foam density.

After mixing, the material is cast in its liquid plastisol state on a silicone coated release liner at a thickness which is proportional to its desired final thickness. In order to produce a 15 lb/ft density foam the casting ratio is about 3:1. The plastisol is then heated for a predetermined time span at a predetermined temperature in order to allow the plastisol to expand and fuse with the plasticizers to form the foam end product. During heating, the blowing agent decomposes and becomes entrapped in the resulting foam which is of a closed-cell type. The foam is then cooled and wound into rolls for eventual shipment. Surface adhesive, usually of an acrylic base, pressure sensitive variety may be applied to one or both sides of the foam if the final use is intended as a foam tape product. The following example is indicative of the above process.

EXAMPLE 1

The following chemicals were mixed together until the mass became uniform in composition.
100 parts foamable PVC resin
100 parts glutarate ester plasticizer
10 parts trimelliate ester plasticizer
1 part cell stabilizer
1.5 parts activator stabilizer
1.5 parts color stabilizer
3.5 parts blowing agent
10 parts viscosity depressant After mixing, the resulting liquid plastisol was cast onto a silicone treated, 80 pound, Kraft release paper at a thickness of 1/16 inch. The mixture was then heated in a conventional oven at 385°–390° F. for approximately three minutes. The resulting closed cell foam at 3/16 inches thickness and approximately 15 pounds per cubic foot density was allowed to cool to room temperature and then subjected to accelerated pressure and aging tests on the following substrates:

Polycarbonate (Lexan)
Acrylic (plexiglass)
Polyester
Fiberglass
ABS plastic
Polypropylene composites No cracking of the surface of the plastic was observed after testing, nor was any shadowing or marring of the plastic observed after the foam was removed.

It should be understood that the following description does not limit the invention to the precise details outlined above, but may be modified within the scope of the following claims without departing from the intended range of the invention.

I claim:

1. A method of making foam comprising the steps of:
   (a) blending a quantity of a foamable PVC resin with a glutarate ester plasticizer, a stabilizer compound, a blowing agent and a viscosity depressant to form a plastisol;
   (b) casting said plastisol on a release liner;
   (c) heating said plastisol to expand the plastisol into a foam; and
   (d) cooling said foam.

2. The method of claim 1 wherein step (a) includes blending a quantity of trimelliate ester plasticizer into said plastisol.

3. The method of claim 1 wherein step (b) includes casting said plastisol on a silicone-treated release paper.

4. The method of claim 1 and a step (e) of applying a pressure sensitive adhesive to an exposed surface of said foam.

5. The method of claim 1 wherein step (c) includes heating said plastisol in an oven for approximately three minutes at 385°–390° F.

6. The method of claim 1 and a step (e) of winding said foam into rolls.

7. The method of claim 1 wherein step (b) includes casting said plastisol on said release liner at a thickness proportional to the desired thickness of said foam.

8. A method of making plastics-compatible foam comprising the steps of:
   (a) blending 100 parts by weight of a foamable PVC resin with the following compounds to form a plastisol;
      (i) 70–140 parts by weight of a glutarate ester plasticizer;
      (ii) 0–10 parts by weight of a trimelliate ester plasticizer;
      (iii) 1–2 parts by weight of a cell stabilizer;
      (iv) 1.5–2 parts by weight of an activator stabilizer;
      (v) 1.5–2 parts by weight of a color stabilizer;
      (vi) a quantity of a blowing agent compound to control foam density; and
      (vii) 5–15 parts by weight of a viscosity depressant;
   (b) casting said plastisol on a release liner;
   (c) heating said plastisol to expand the plastisol into a foam; and
   (d) cooling said foam.

9. The method of claim 8 wherein step (b) includes casting said plastisol on a silicone-treated release paper.

10. The method of claim 8 and a step (e) of applying a pressure sensitive adhesive to an exposed surface of said foam.

11. The method of claim 8 wherein step (c) includes heating said plastisol in an oven for approximately three minutes of 385°–390° F.

12. The method of claim 8 wherein step (b) includes casting said plastisol on said release liner at a thickness proportional to the desired thickness of said foam.

13. A foam adapted for use with plastic-based materials, said foam comprising an expanded mixture of foamable PVC resin, a gluturate ester plasticizer, stablizing agents, and a viscosity depressant.

14. The foam of claim 13 wherein said mixture further includes a trimelliate ester plasticizer.

15. A plastics compatible foam comprising an expanded mixture of:
   (a) 100 parts by weight of foamable PVC;
   (b) 70–140 parts by weight of glutarate ester plasticizer;
   (c) 0–10 parts by weight of trimelliate ester plasticizer;
   (d) 1–2 parts by weight of a cell stabilizer;
   (e) 1.5–2 parts by weight of an activator stabilizer;
   (f) 1.5–2 parts by weight of a color stabilizer;
   (g) 5–15 parts by weight of viscosity depressant; and
   (h) a quantity of decomposed blowing agent proportional to a predetermined foam density.

16. The plastics compatible foam of claim 15 and a silicone treated release liner, said expanded mixture cast on said release liner.

17. The plastics compatible foam of claim 15 and a pressure sensitive adhesive applied to one or more exposed surfaces of said foam wherein said foam constitutes tape means for adhering plastics based materials to a substrate.

* * * * *